United States Patent
Guerlet et al.

(10) Patent No.: US 6,221,506 B1
(45) Date of Patent: Apr. 24, 2001

(54) BUSHING BASE WITH MOUNTED NOZZLES

(75) Inventors: Jean-Paul Guerlet; Franck Pouliquen, both of Paris; Daniel Michel, Creteil, all of (FR)

(73) Assignee: Engelhard-CLAL S.A.S., Paris (FR)

( * ) Notice: Subject to any disclaimer, the term of this patent is extended or adjusted under 35 U.S.C. 154(b) by 0 days.

(21) Appl. No.: 09/214,440

(22) PCT Filed: Jul. 10, 1997

(86) PCT No.: PCT/FR97/01255

§ 371 Date: Jan. 11, 1999

§ 102(e) Date: Jan. 11, 1999

(87) PCT Pub. No.: WO98/02387

PCT Pub. Date: Jan. 22, 1998

(30) Foreign Application Priority Data

Jul. 12, 1996 (FR) .................................................. 96 08739

(51) Int. Cl.$^7$ ................................ B32B 3/10; B23P 15/16
(52) U.S. Cl. ........................... 428/596; 29/6.1; 29/522.1; 29/523; 29/DIG. 4; 65/492; 65/493; 65/495; 65/374.12; 72/370.06; 72/700; 75/252; 75/255; 76/107.6; 83/30; 148/24; 156/293; 228/56.3; 228/193; 228/196; 228/197; 228/224; 420/466; 420/467; 428/598; 428/637; 428/670
(58) Field of Search .................................... 428/670, 637, 428/596, 598; 148/24; 420/466, 467; 156/293; 76/107.6; 83/30; 72/370.06, 700; 75/255, 252; 29/6.1, 522.1, 523, DIG. 4; 65/492, 493, 495, 374.12; 228/56.3, 193, 196, 197, 224

(56) References Cited

U.S. PATENT DOCUMENTS

| 3,741,460 | 6/1973 | Matulewicz | 228/5.1 |
| 5,340,012 | * 8/1994 | Beeferman et al. | 228/56.3 |
| 5,885,318 | * 3/1999 | Shimizu et al. | 65/493 |

FOREIGN PATENT DOCUMENTS

| 375494 | 4/1964 | (CH) . |
| 2009618 | 6/1970 | (FR) . |
| WO 82/01510 | 5/1982 | (WO) . |

OTHER PUBLICATIONS

Furusawa Masaaki, "Manufacturing of Bushingfor Producing Long Fiber", Patent Abstracts of Japan vol. 12, No. 82 (C–481), [2929], Mar. 17, 1986, 61058847, JP 62216937 Sep. 24, 1987 (Nippon Glass Seni K. K. )].

* cited by examiner

Primary Examiner—Deborah Jones
Assistant Examiner—Robert R. Koehler
(74) Attorney, Agent, or Firm—Nath & Associates; Gary M. Nath; Harold L. Novick

(57) ABSTRACT

The invention relates to a method of manufacturing a bushing baseplate, and to a bushing baseplate. The bushing baseplate is characterized in that it comprises tips (18) constituted by hollow tubular elements of outside diameter slightly smaller than the inside diameter of holes (16) in the plate (12) forming the bushing baseplate, which tips are subjected to a step of being expanded radially relative to their axes. The method is simpler and less expensive.

56 Claims, 2 Drawing Sheets

BUSHING BASE WITH MOUNTED NOZZLES

The present invention relates to a method of manufacturing a bushing baseplate, and also to the bushing baseplate obtained thereby and to the bushing itself. The invention also covers brazing filler pastes as novel substances. More particularly, the invention relates to a method of manufacturing a bushing baseplate for drawing glass fibers, to bushing baseplates obtained thereby, and to brazing filler pastes as novel substances.

DESCRIPTION OF THE PRIOR ART

In the manufacture of glass fiber commonly used for reinforcing plastics materials, the bushing is the most critical tool in the production line since it determines the quality of the final product.

The bushing is generally made of an alloy of platinum and rhodium and is in the form of a box into which molten glass is inserted, the box having a baseplate that is perforated by numerous holes. Each of these holes is constituted by a pierced jet known as a "tip" through which the glass flows out to produce a fiber once it has solidified.

In the "direct fusion" bushing technique, the glass is fed in the molten state but, in order to maintain thermal equilibrium, it is necessary to heat the body of the bushing by the Joule effect. The plate constituting the baseplate has several hundred or even several thousand tips, and in bushings already in existence or under development, the number of tips can be as great as 4,000 or even 6,000.

In general, in order to avoid deformation of the baseplate, it is known to distribute mechanical reinforcement over the length thereof and between the locations of the tips, thereby ensuring better stiffness in use.

Present technologies for manufacturing bushings, and in particular for manufacturing bushing baseplates, need to take account of economic constraints associated with fiber production or with drawing from a bushing, and of techniques associated with the geometry and the number of tips per unit area of baseplate through which fibers can be drawn.

A method of manufacturing a bushing baseplate has already been proposed that is based on deforming the entire plate that is to constitute the bushing baseplate by means of a deep-drawing operation.

Unfortunately, a deep-drawing method makes it very difficult to obtain a bushing baseplate of thickness having good regularity.

In the context of a deep-drawing method, it is necessary to leave a sufficient volume of metal between two adjacent holes since otherwise metal taken therefrom during the deep-drawing operation can give rise to weak points in the thickness of the baseplate, and guaranteeing such volumes of metal is very difficult to obtain because of the small spacing.

That technology naturally also prevents to use different materials for the baseplate and for a tip. Deep-drawing technology is also expensive since it requires expensive tooling for deep-drawing purposes, even when deep-drawing is performed area by area. Furthermore, that method lacks flexibility since it is necessary to make a new tool when changing from one model to another.

As a result, the technology has moved to implementing a so-called "associative" manufacturing method which is much more flexible since it consists in fixing tips to a baseplate in which some corresponding number of holes have been formed.

For example, application JP-A-6-218448 published on Aug. 9, 1994 discloses a method in which a certain number of holes are perforated through a bushing baseplate and solid tip-forming cylinders are inserted therein, which cylinders are subsequently flattened or jagged and then perforated.

Similarly, document JP-A-7-81968 published on Mar. 28, 1995, describes inserting hollow tubular elements in the holes of a bushing baseplate, which elements are assembled therein by constituting an interference fit prior to being subjected to diffusion bonding treatment.

Similarly, document JP-A-7-187702, published Jul. 27, 1995, describes a method similar to that of the preceding document, using hollow tubular elements having an outside diameter greater than the inside diameter of the holes in the baseplate.

Proposals are also made in document JP-A-6-171971 published on Jun. 21, 1994 for a method of manufacturing a bushing furnace plate in which, after bushing tips have been inserted in the holes of a baseplate, a spacer element is interposed between each orifice and each tip and is then subjected to diffusion bonding treatment.

The methods of the second category are known as "fitted tip techniques". The invention forms part of this category technique.

In the prior art of this fitted tip technique, the most widely used bonding method is the method of bonding by diffusion heat treatment. An example of such diffusion heat treatment is given in document U.S. Pat. No. 4,461,191. Prior document JP-A-6-171971 published on Jun. 21, 1994, also performs diffusion bonding.

In the context of diffusion bonding methods, the object is to establish initially, in the hole, intimate contact between a tip and the plate, and then to cause material to diffuse between the tip and the plate during heat treatment at high temperature, the duration and the temperature of the heat treatment being adjusted as a function of the materials being assembled together and as a function of their surface states. The major technical problem with assembled tips is that of obtaining good sealing between each tip and the plate.

An object of the present invention is thus to solve the technical problem consisting in providing a solution in the context of assembled tip techniques that enables good sealing to be obtained between each tip and the plate by limiting or even reducing the number of steps required, while simultaneously making it possible to implement a method that is essentially suitable for full automation.

The invention therefore also needs to solve this problem at low cost, by means of a method that is safe and reliable and which can be used on an industrial scale. The invention makes it possible for the first time to solve this novel technical problem.

Thus, in a first aspect, the present invention provides a method of manufacturing a bushing baseplate, the method comprising making a plurality of holes in a plate that is to constitute the bushing baseplate, inserting at least one tip constituted by a hollow tubular element defining a through duct in each hole in said plate, and bonding the tips to said plate by heat treatment, the method being characterized in that the outside diameter of a tip is slightly smaller than the inside diameter of a hole so as to leave a small amount of clearance after a tip has been inserted in a hole for appropriate positioning, the tip is subjected to mechanical expansion, e.g. by inserting a punch in the duct of the tubular element, thereby mechanically securing the tips and the plate that are to be joined by intimate contact between the walls thereof inside each hole.

In a variant implementation, the heat treatment of bonding of the tips with the plate comprises solid state diffusion.

In another variant implementation, prior to performing heat treatment, continuous lines of a brazing filler paste are positioned between the rows of tips, preferably on the outside of the bushing baseplate, the composition of the paste being adjusted to be liquid at the bonding heat treatment temperature, so that the brazing filler paste, once melted, fills the gaps that may remain between the walls of the tips and the holes in the plate so as to guarantee a good sealing.

In a variant implementation, the above-specified plate is a plate of platinum or platinum alloy.

In another implementation, the tips are made of the same metal or alloy as the plate. The tips may also be made of a metal or alloy that is different from that of the plate.

In another variant implementation, the above-mentioned mechanical expansion consists in performing expansion radially to the axis of the holes in the plate, said axis also essentially coinciding with the axis of the tips in the form of hollow tubular elements.

In a particularly advantageous implementation of the invention, said brazing filler paste comprises a metal or alloy having a melting point lower than that of the metal or alloy constituting the plate and/or the tips.

In a particularly preferred implementation, the brazing filler paste is based on palladium or on platinum, optionally combined with at least one metal for lowering its melting point, in the form of powder dispersed in a polymer binder and optionally a solvent for making said paste.

In an advantageous variant implementation, the brazing filler paste is constituted by palladium powder combined with a polymer binder having a decomposition temperature greater than 200° C., better greater than 300° C., and preferably not less than 400° C. The polymer binder is preferably a castable polymer binder having viscosity that is adapted to constituting said brazing filler paste. By way of example, the polymer binder can be a polybutene of appropriate molecular weight.

In a particular implementation, the brazing filler paste comprises 80% to 90% palladium powder and 10% to 20% polymer binder.

In another particular implementation, the brazing filler paste comprises an alloy of platinum and copper in powder form dispersed in a polymer binder having a decomposition temperature greater than 200° C., better greater than 300° C., and preferably not less than 400° C. The polymer binder is preferably as defined above.

In an advantageous variant implementation, the brazing filler paste comprises an alloy of platinum and copper, where the copper fraction constitutes 20% to 40% by weight of the alloy, and preferably about 35% by weight. Furthermore, the platinum-copper alloy can be dispersed at 95% to 80% by weight in a polymer binder constituting 5% to 20% by weight, which binder is preferably as defined above.

In another preferred implementation of the invention, after that continuous line of brazing filler paste has been deposited along each row of tips, a baking operation is performed at low temperature, higher than the decomposition temperature of the binder, so as to eliminate the volatile materials included in the binder, and the diffusion welding heat treatment is performed at a temperature at which the brazing filler paste is melted.

In a particular variant implementation, particularly relating to manufacturing a baseplate having a very large number of tips, after the diffusion bonding heat treatment, leakage testing is performed, e.g. by the technique of red organol sweating in the presence of talc, and in the event of leakage, the method is restarted from tip expansion.

In a presently preferred use, the starting plate is a plate designed to constitute the baseplate of a bushing for making glass fibers or filaments. In which case, the plate forming a bushing baseplate for making glass fibers or filaments is made of a platinum-rhodium alloy, e.g. having 10% rhodium, the tips are also made from platinum-rhodium bars, e.g. having 10% rhodium, and the diffusion bonding heat treatment is performed at a temperature of about 1350° C. for at least 10 hours, in particular for 13 hours.

In another advantageous variant implementation, the initial clearance between each tip and its hole in the plate is less than 30 microns.

In a second aspect, the present invention also covers a bushing baseplate characterized in that it comprises tips constituted by hollow tubular elements initially having an outside diameter slightly smaller than the inside diameter of holes in the plate forming the bushing baseplate, which tips have been subjected to a step of mechanical expansion radially relative to their axis.

In a particular embodiment of this bushing baseplate, the tips are brazed to the bushing baseplate by means of a brazing filler paste based on a metal or a metal alloy whose melting point is lower than the melting point of the metal or metal alloy constituting the plate and/or the tips.

In a presently preferred embodiment, the bushing baseplate is based on platinum, in particular on a platinum-rhodium alloy, as are the tips, while the brazing filler paste initially comprises palladium powder or palladium alloy powder, preferably pure palladium powder, or platinum powder together with powder of a metal or metal alloy having a melting point lower than that of platinum, in particular copper.

In a third aspect, the present invention also covers a brazing filler paste as a novel substance. This brazing filler paste comprises a metal or metal alloy having a melting point lower than the melting point of the metal or metal alloy constituting the tips and/or the plate forming the bushing baseplate, the paste being in the form of a powder dispersed in a polymer binder, having a decomposition temperature greater than 200° C., better greater than 300° C., and preferably not less than 400° C.

In an advantageous variant embodiment, said polymer binder is castable and has viscosity adapted to constituting said brazing paste.

In another particular variant embodiment, the above-mentioned powder has a mean particle diameter of less than 20 micrometers, in particular said powder has at least 95% of its particles with a diameter of less than 20 microns.

In a particular variant embodiment, the brazing filler paste has viscosity of at least 100,000 (one hundred thousand) centipoises, better lying in the range 100,000 (one hundred thousand) to 500,000 (five hundred thousand) centipoises as measured by a HAAKE RV 12 PK 100 viscosity measuring device at a temperature of 0.5° C. and rotating with a speed of rotation of 0.8 revolutions per minute. For example, the polymer binder comprises or is constituted by polybutene having an appropriate molecular weight.

Other objects, characteristics, and advantages of the invention will also appear clearly to the person skilled in the art from the following description made with reference to two presently preferred embodiments of the invention which form an integral part of the invention.

Figure 1:
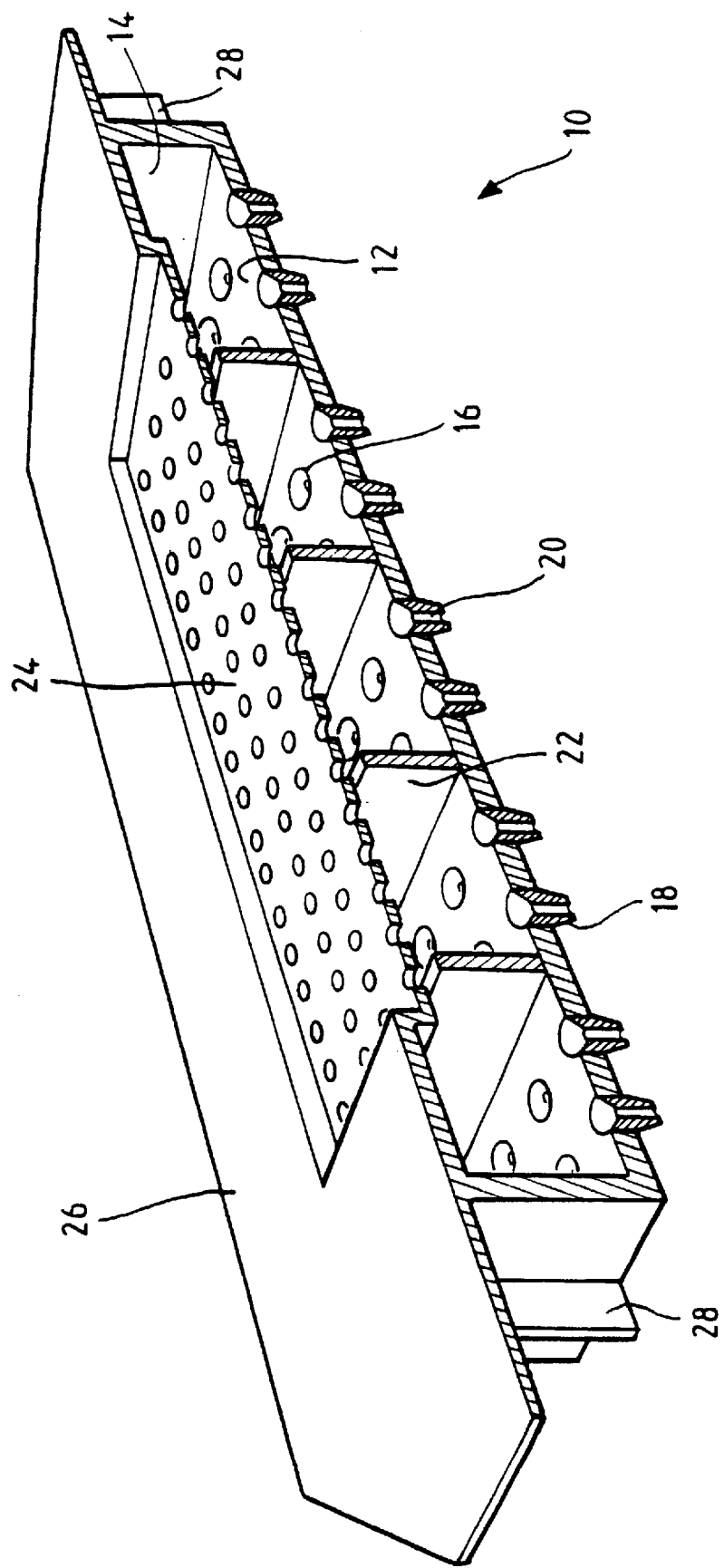
FIG. 1 is a diagrammatic view of a bushing baseplate of the invention comprising the main members of a bushing, fitted with fiber-drawing tips implemented by the present invention.

With reference to FIG. 1, there can be seen a bushing, intended in this case for drawing glass to manufacture glass fibers or filaments, said bushing being given overall reference numeral 10. More precisely, the bushing comprises a baseplate 12 secured to a body 14.

The baseplate 12 of the bushing 10 has a multitude of holes 16 in which there are inserted respective tips 18 constituted by hollow tubular elements each defining a through duct 20. By way of example, the baseplate 12 is mechanically reinforced by stiffener elements 22 on which there rests a grid 24 through which molten glass pours. It is also possible to provide a collar 26 outlining the glass pouring zone. The bushing 10 is heated by electricity feed tabs 28 as is conventional in the prior art. In the context of the invention, the bushing baseplate is modified to have tips 18 constituted by hollow tubular elements that are initially of an outside diameter (de) that is slightly smaller than the inside diameter (di) of the holes 16 through the plate 12, as can be seen clearly by comparing FIGS. 2 and 3 with FIG. 4.

It will be observed that in the embodiment shown, the hollow tubular elements 18 are mainly conical in outside shape, but naturally the outside shape of the tubular elements could be essentially cylindrical. The conical outside shape shown makes these elements easier to insert in the holes 16 of the plate 12. Once the tips 18 have been inserted in the holes 16 of the plate 12, there remains a small amount of clearance (j) that may be of the order of 30 micrometers (see FIG. 4).

Figure 5:
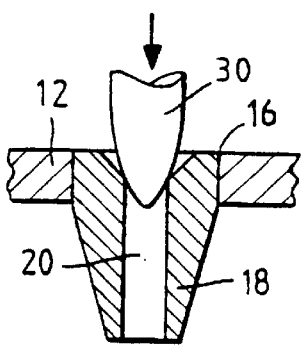
FIG. 5 shows the step of mechanically expanding a through duct radially relative to its axis.
Figure 6:
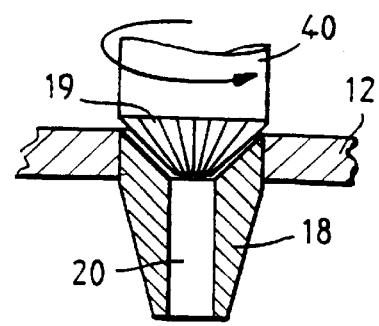
FIG. 6 shows, in a particular implementation, a step of machining a final cone on the inner end of the tip, prior to subjecting it to the necessary heat treatments.

Mechanical expansion is then performed, e.g. by means of a punch 30 of appropriate shape, e.g. conical, which exerts a mechanical expansion force radially by advancing into the duct 20 of the tip 18, as represented by the arrows in FIG. 5.

Figure 7:
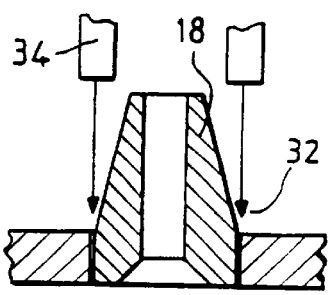
FIG. 7 is a diagram of a preferred step of the invention in which a continuous line of brazing filler paste is deposited on the junctions between the tips and the plate, prior to performing the heat treatment.

After mechanical expansion, it is preferable to deposit a stroke or a continuous line of brazing filler paste by means of a deposition device 34 containing the brazing filler paste and of a shape that matches the shape of the hole 16, the filler paste being deposited on the outside of the bushing baseplate, as shown in FIG. 7, said brazing filler paste being in the form of a composition that is adapted to be melted at the temperature of the brazing heat treatment (see FIG. 7). This procedure makes it possible to guarantee very good tightness.

Before or after this step, it is possible to create a final cone 19 by means of an appropriate tool 40.

Finally, the tips 18 are bonded to the plate 12 by applying heat treatment which advantageously comprises heat treatment by solid state diffusion.

Advantageously, the heat treatment is performed at a temperature at which the brazing filler paste is molten, enabling it to penetrate into the gaps or orifices left between the outside walls of the tips 18 and the inside walls of the holes 16 in the plate 12. Depositing the brazing filler paste on the outside of the bushing baseplate is advantageous since the projecting portions of the tips outside the bushing baseplate prevent the brazing filler paste from penetrating into the ducts 20 of the tips 18.

The conditions under which such heat treatment should be performed are well known to the person skilled in the art and depend on the metal used for making the plate 12 and on the metal used for making the tips 18. Advantageously, the metal is identical in both cases.

In an embodiment as described above, the plate is a platinum plate, whereas in another embodiment, the above-mentioned plate is a platinum-rhodium plate, in particular a plate having 10% by weight rhodium.

The invention is described below with reference to two examples given purely by way of illustration and which can in no way limit the scope of the invention.

EXAMPLE 1

Figure 2:
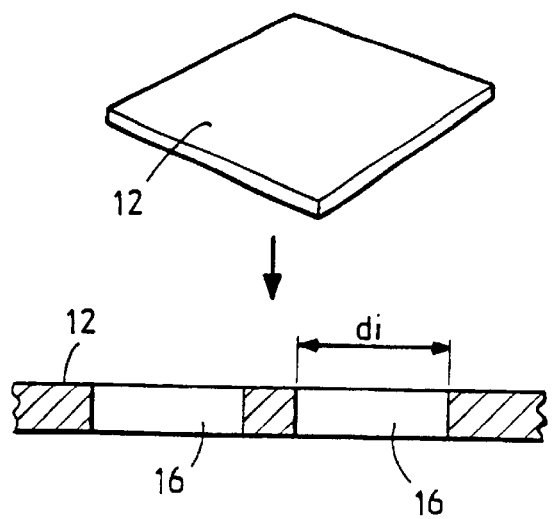
FIG. 2 shows the step of drilling a plate to make the tip-fixing holes.
Figure 3:
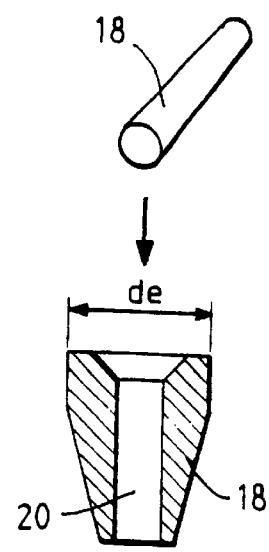
FIG. 3 shows the step of working solid or hollow bars that are to constitute tips in the form of hollow tubular elements defining through ducts.

The bushing baseplate of the invention is manufactured in accordance with the method of the invention as follows:

a) By way of example, the initial plate is a platinum-rhodium plate having 10% by weight rhodium and having the final dimensions of the baseplate 12 of the bushing 10.

b) The holes 16 are made in the plate 12 by punching and boring, followed by cambering (see FIG. 2).

c) Thereafter, the tips 18 are machined by being cut off from a solid or hollow bar, preferably in this case likewise made of platinum-rhodium with 10% by weight rhodium (see FIG. 3).

Figure 4:
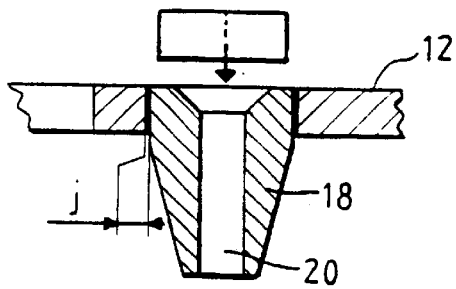
FIG. 4 shows the step of assembling the through-duct tips of FIG. 3 by inserting them in the holes of the plate of FIG. 2.

Thus, prior to assembly, each tip has its final outside shape and the design clearance between the hole 16 and the tip 18 is less than 30 micrometers.

d) The tips 18 are then placed in the holes 12, as shown in FIG. 4.

e) The tubular wall of each tip 18 is automatically expanded radially outwards by inserting a tool such as a punch in the duct 20 of the tip 18 (see FIG. 5).

f) In a first variant embodiment, it is then possible to perform heat treatment for solid state diffusion bonding, e.g. in an electrical resistance oven at a temperature greater than 1300° C., e.g. 1350° C. for at least 10 hours, e.g. 13 hours.

g) Thereafter, a leak test is performed by a leak testing technique well known to the person skilled in the art, e.g. a technique of sweating red organol in the presence of talc.

If there is a leak, sequences e) to g) are repeated until the leak test shows no further leakage.

h) Finally, the shape of the tip 18 can be finished, e.g. by machining an inlet cone to the tip 18 and by finishing off boring, as is well known to the person skilled in the art.

EXAMPLE 2

The method is as described for Example 1 concerning steps a) to e).

However, thereafter, in a variant there follows an additional step which consists in using a brazing filler paste.

f) Thus, a brazing filler paste of the above-described type is prepared, e.g. based on a platinum-copper powder having 35% by weight copper, dispersed in a polymer binder, the powder constituting about 93% of the filler paste and the binder about 7%, the binder being polybutene, for example, with viscosity of about 200,000 centipoises as measured using the HAAKE RV12 PK 100 viscosity measuring device at temperature of 0.5° C. and rotating at a speed of rotation of 0.8 revolutions per minute.

It is also possible to use as the brazing filler paste, powdered palladium in a polymer binder, the binder representing 14% by weight of the filler paste.

g) A continuous line of brazing filler paste 32 is deposited along each line of tips 18 by means of an automatic dispenser 34 controlled with a needle, e.g. having a diameter of 0.33 mm, running along the outside of the bushing baseplate, as shown diagrammatically in FIG. 7.

h) Thereafter, baking treatment is performed at moderate temperature, greater than the decomposition point of the volatile materials in the filler paste, mainly the polymer binder, e.g. at about 600° C.

i) Thereafter, heat treatment is performed for diffusion welding with the brazing filler paste in the molten state in the electrical resistance oven as described above in Example 1 at step f), e.g. at 1350° C. for 13 hours.

j) Thereafter the above-mentioned leak testing is performed and the sequences are restarted from expansion of the tubular wall of the tip 18 until the leak test fails to show any leakage.

What is claimed is:

1. A method of manufacturing a bushing baseplate, the method comprising:

making a plurality of through holes in a plate that is to comprise the bushing baseplate, each through hole having an inner wall;

inserting at least one tip comprising a hollow tubular element defining a through duct into each through hole in said plate; and bonding the at least one tip to said plate by a heat treatment;

the method being characterized in that an outside diameter of said at least one tip is slightly smaller than an inside diameter of a corresponding one of said plurality of through holes so as to leave a small amount of clearance for appropriate positioning after said at least one tip has been inserted in said corresponding one of said plurality of through holes and whereby prior to said heat treatment each of said at least one tip is subjected to a mechanical expansion of its outside diameter thereby mechanically securing an outer surface of said at least one tip to said inner wall of said corresponding one of said plurality of through holes in said plate; and whereby said at least one tip and said plate are joined by brazing.

2. A method according to claim 1, characterized in that the bonding heat treatment of the at least one tip with the plate comprises solid state diffusion.

3. A method according to claim 1, characterized in that prior to performing said heat treatment, a continuous line of a brazing filler paste is positioned between a plurality of rows of said at least one tip, wherein a composition of the brazing filler paste is characterized by a melting point at a bonding heat treatment temperature.

4. A method according to claim 3, characterized in that the plate is comprises platinum or a platinum alloy.

5. A method according to claim 1, characterized in that the at least one tip comprises a same metal or alloy as the plate.

6. A method according to claim 1, characterized in that the mechanical expansion comprises performing an expansion radially to the axes of the through holes in the plate, said axes also essentially coinciding with the axes of corresponding ones of said at least one tip.

7. A method according to claim 3, characterized in that said brazing filler paste comprises a metal or alloy having a melting point lower than that of a metal or alloy comprising the plate and lower than that of a metal or alloy comprising the at least one tip.

8. A method according to claim 7, characterized in that the brazing filler paste comprises palladium or platinum, optionally combined with at least one metal for lowering its melting point, in the form of a powder dispersed in a polymer binder and optionally a solvent for making said brazing filler paste.

9. A method according to claim 8, characterized in that the brazing filler paste comprises palladium powder combined with a polymer binder having a decomposition temperature greater than 200° C.

10. A method according to claim 9, characterized in that the brazing filler paste comprises 80% to 90% palladium powder and 10% to 20% polymer binder.

11. A method according to claim 3, characterized in that the brazing filler paste comprises an alloy of platinum and copper in powder form dispersed in a polymer binder having a decomposition temperature greater than 200° C.

12. A method according to claim 11, characterized in that the brazing filler paste comprises an alloy of platinum and copper, in which the copper comprises 20% to 40% of the alloy by weight.

13. A method according to claim 3, characterized in that after said continuous line of brazing filler paste has been deposited along each of said plurality of rows of said at least one tip, a baking operation is performed at low temperature, higher than a decomposition temperature of the polymer binder, so as to eliminate a volatile material included in the binder, and the heat treatment is performed at a temperature at which the brazing filler paste is melted.

14. A method according to claim 1, characterized in that after the heat treatment, a leakage testing is performed, and in the event of leakage, the method is restarted from said mechanical expansion.

15. A method according to claim 1, characterized in that said plate is designed to comprise said bushing baseplate, said bushing baseplate being for making glass fibers or filaments.

16. A method according to claim 15, characterized in that the plate forming the bushing baseplate comprises a platinum-rhodium alloy and the at least one tip comprises platinum-rhodium bars, and the heat treatment is performed at a temperature of about 1350° C. for at least 10 hours.

17. A method according to claim 1, characterized in that an initial clearance between said outside diameter of each of said at least one tip and said inner wall of its corresponding through hole in the plate is less than 30 microns.

18. A bushing baseplate, characterized in that said bushing baseplate comprises tips comprising hollow tubular elements initially having an outside diameter slightly smaller than an inside diameter of corresponding holes in a plate forming the bushing baseplate;

wherein said tips have been mechanically expanded radially relative to their axes; and wherein said tips and said plate are coined by brazing.

19. A bushing baseplate according to claim 18, characterized in that the tips are brazed to the bushing baseplate by means of a brazing filler paste comprising a metal or a metal alloy whose melting point is lower than a melting point of a metal or metal alloy comprising the plate and lower than a melting point of a metal or metal alloy comprising the tips.

20. A bushing baseplate according to claim 19, characterized in that the bushing plate and the tips comprise platinum, while the brazing filler paste comprises palladium powder or palladium alloy powder, or platinum powder together with a powder of a metal or metal alloy having a melting point lower than that of platinum.

21. A brazing filler paste, characterized in that said brazing filler paste comprises a metal or metal alloy powder having a melting point lower than a melting point of a metal or metal alloy comprising tips and lower than a melting point of a metal or metal alloy comprising a plate forming a bushing baseplate for making glass fibers or filaments, the brazing filler paste being in the form of a powder dispersed in a polymer binder, having a decomposition temperature greater than 200° C.

22. A brazing filler paste according to claim 21, characterized in that the polymer binder is castable and has a viscosity appropriate for comprising said brazing filler paste wherein said brazing filler paste's viscosity is at least 100,000 centipoises, as measured by a viscosity measuring device at a temperature at 0.5° C. and rotating at a speed of rotation of 0.8 revolutions per minute.

23. A brazing filler paste according to claim 21, characterized in that the metal or metal alloy powder has a mean particle diameter of less than 20 micrometers.

24. A brazing filler paste according to claim 21, characterized in that said polymer binder is castable and comprises polybutene.

25. A brazing filler paste according to claim 21, characterized in that the brazing filler paste comprises palladium or palladium alloy powder, or platinum powder together with powder of a metal or a metal alloy having a melting point lower than that of platinum.

26. A method of manufacturing a bushing baseplate, the method comprising:

making a plurality of through holes in a plate that is to comprise the bushing baseplate, each of said plurality of through holes having an inner wall;

inserting at least one tip comprising a hollow tubular element defining a through duct into each of said plurality of through holes in said plate; and bonding the at least one tip to said plate by a heat treatment;

the method being characterized in that an outside diameter of said at least one tip is slightly smaller than an inside diameter of a corresponding one of said plurality of through holes so as to leave a small amount of clearance for appropriate positioning after each of said at least one tip has been inserted in said through holes; and wherein a continuous line of a brazing filler paste is positioned between a plurality of rows of said at least one tip, wherein a composition of the brazing filler paste is characterized by a melting point at a bonding heat treatment temperature; and whereby said at least one tip and said plate are joined by brazing.

27. The method as claimed in claim 26 wherein said brazing filler paste is positioned on an outside surface of the bushing baseplate.

28. A method of manufacturing a bushing baseplate, the method comprising:

making a plurality of through holes in a plate that is to comprise the bushing baseplate, each of said plurality of through holes having an inner wall;

inserting at least one tip comprising a hollow tubular element defining a through duct into each of said plurality of through holes in said plate;

providing a brazing filler paste, characterized in that said brazing filler paste comprises a metal or metal alloy having a melting point lower than a melting point of a metal or metal alloy comprising said at least one tip and lower than a melting point of a metal or metal alloy comprising said plate forming said bushing baseplate for making glass fibers or filaments, the brazing filler paste being in the form of a powder dispersed in a polymer binder; and bonding the at least one tip to said plate by a heat treatment, whereby said at least one tip and said plate are joined by brazing.

29. A method of manufacturing a bushing baseplate, the method comprising:

making a plurality of through holes in a plate that is to comprise the bushing baseplate, each of said plurality of through holes having an inner wall;

inserting at least one tip comprising a hollow tubular element defining a through duct into each of said plurality of through holes in said plate; and bonding the at least one tip to said plate by a heat treatment;

the method being characterized in that an outside diameter of said at least one tip is slightly smaller than an inside diameter of a corresponding one of said plurality of through holes so as to leave a small amount of clearance for appropriate positioning after each of said at least one tip has been inserted in said through holes, and whereby each of said at least one tip is subjected to mechanical expansion of its outside diameter thereby mechanically securing an outer surface of said at least one tip to said inner wall of said corresponding ones of said plurality of through holes in said plate; and further characterized by performing a leakage test.

30. The method as claimed in claimed 29 wherein said leakage test is performed in the presence of a dye.

31. The method as claimed in claim 30 wherein said dye is red organol and said leakage test is performed by a technique of red organol sweating in the presence of talc.

32. A bushing baseplate, characterized in that said bushing baseplate comprises tips comprising a hollow tubular elements initially having an outside diameter slightly smaller than an inside diameter of corresponding holes in a plate forming the bushing baseplate, and which tips have been mechanically expanded radially relative to their axes;

wherein said tips are brazed to the bushing baseplate by means of a brazing filler paste comprising a metal or a metal alloy whose melting point is lower than a melting point of a metal or metal alloy comprising said tips and lower than a melting point of a metal or metal alloy comprising said plate forming said bushing baseplate.

33. The method as claimed in claim 1 wherein said mechanical expansion is performed by inserting a punch in the through duct of the tubular element.

34. The method as claimed in claim 3 wherein said line of brazing filler paste is positioned on an outside surface of said bushing baseplate.

35. The method as claimed in claim 9 wherein said decomposition temperature is greater than 300° C.

36. The method as claimed in claim 35 wherein said decomposition temperature is not less than 400° C.

37. The method as claimed in claim 11 wherein said decomposition temperature is greater than 300° C.

38. The method as claimed in claim 37 wherein said decomposition temperature is not less than 400° C.

39. The method as claimed in claim 12 in which the copper comprises about 35% of the alloy by weight.

40. The method as claimed in claim 39 wherein the platinum-copper alloy is dispersed at 95% to 80% by weight in a polymer binder comprising 5% to 20% by weight.

41. The method as claimed in claim 12 wherein the platinum-copper alloy is dispersed at 95% to 80% by weight in a polymer binder comprising 5% to 20% by weight.

42. The method of claim 14 wherein said leakage testing is performed in the presence of a dye.

43. The method of claim 14 wherein said leakage testing is performed by a technique of red organol sweating in the presence of talc.

44. A method according to claim 16, wherein said plate comprises a platinum-rhodium alloy having 10% rhodium.

45. A method according to claim 16, wherein said tips comprises platinum-rhodium bars having 10% rhodium.

46. A method according to claim 16, wherein the heat treatment is performed for 13 hours.

47. A bushing baseplate according to claim 20, characterized in that the bushing plate and the tips comprise a platinum-rhodium alloy.

48. A bushing baseplate according to claim 20, characterized in that said brazing filler paste comprises pure palladium powder.

49. A bushing baseplate according to claim 20, characterized in that said powder of a metal or metal alloy having a melting point lower than that of platinum comprises copper.

50. A brazing filler paste as claimed in claim 21, wherein said decomposition temperature is greater than 300° C.

51. A brazing filler paste as claimed in claim 50, wherein said decomposition temperature is not less than 400° C.

52. A brazing filler paste according to claim 22, wherein said brazing filler paste has a viscosity in the range from 100,000 centipoises to 500,000 centipoises.

53. A brazing filler paste according to claim 23, wherein said metal or metal alloy powder has at least 95% particles with a diameter of less than 20 micrometers.

54. A brazing filler paste according to claim 25, characterized in that said brazing filler paste comprises pure palladium powder.

55. A brazing filler paste according to claim 25, characterized in that said powder of a metal or metal alloy having a melting point lower than that of platinum comprises copper.

56. A bushing baseplate, characterized in that said bushing baseplate comprises tips comprising hollow tubular elements initially having an outside diameter slightly smaller than an inside diameter of corresponding holes in a plate forming the bushing baseplate;

wherein said tips are brazed to the bushing baseplate by means of a brazing filler paste comprising a metal or a metal alloy whose melting point is lower than a melting point of a metal or metal alloy comprising said tips and lower than a melting point of a metal or metal alloy comprising said plate forming said bushing baseplate.

* * * * *

UNITED STATES PATENT AND TRADEMARK OFFICE
CERTIFICATE OF CORRECTION

PATENT NO. : 6,221,506 B1
DATED : April 24, 2001
INVENTOR(S) : Jean-Paul Guerlet et al.

It is certified that error appears in the above-identified patent and that said Letters Patent is hereby corrected as shown below:

<u>Column 9, claim 18,</u>
Line 3, "coined" should be -- joined --

Signed and Sealed this

Eleventh Day of December, 2001

*Attest:*

NICHOLAS P. GODICI
*Attesting Officer*     *Acting Director of the United States Patent and Trademark Office*